(12) United States Patent
Kim

(10) Patent No.: US 8,661,617 B1
(45) Date of Patent: Mar. 4, 2014

(54) HOOKING STRUCTURE OF VEHICLE DOOR

(71) Applicants: Hyundai Motor Company, Seoul (KR); Kia Motors Corporation, Seoul (KR)

(72) Inventor: Si-Yun Kim, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/731,466

(22) Filed: Dec. 31, 2012

(30) Foreign Application Priority Data

Oct. 11, 2012 (KR) .................. 10-2012-0112773

(51) Int. Cl.
*E05F 5/02* (2006.01)
(52) U.S. Cl.
USPC ............. 16/82; 296/146.6; 296/187.12
(58) Field of Classification Search
USPC ............ 16/82, 49, 83, DIG. 17, DIG. 21; 292/DIG. 15, DIG. 19; 296/146.6, 296/187.03, 187.12; 180/274
See application file for complete search history.

(56) References Cited

U.S. PATENT DOCUMENTS

| | | | | |
|---|---|---|---|---|
| 5,029,934 A * | 7/1991 | Schrader et al. | ........... | 296/146.1 |
| 5,171,058 A * | 12/1992 | Ishikawa | ........... | 296/187.12 |
| 5,404,690 A * | 4/1995 | Hanf | ........... | 296/146.6 |
| 6,203,096 B1 * | 3/2001 | Noda et al. | ........... | 296/146.6 |
| 6,619,725 B2 * | 9/2003 | Gehringhoff et al. | ........... | 296/146.6 |
| 7,520,557 B2 * | 4/2009 | Yoshida et al. | ........... | 296/155 |
| 7,614,685 B2 * | 11/2009 | Oka | ........... | 296/187.12 |
| 7,762,620 B2 * | 7/2010 | Yao | ........... | 296/187.12 |
| 7,884,704 B2 * | 2/2011 | Iwano et al. | ........... | 340/436 |
| 8,152,219 B2 * | 4/2012 | Suzuki | ........... | 296/146.6 |
| 8,215,699 B2 * | 7/2012 | Suzuki et al. | ........... | 296/146.7 |
| 2011/0291442 A1 * | 12/2011 | Oirschot | ........... | 296/187.12 |

FOREIGN PATENT DOCUMENTS

| | | | |
|---|---|---|---|
| EP | 1840002 A1 * | 10/2007 | |
| JP | 2005-170066 A | 6/2005 | |
| JP | 2010173423 A * | 8/2010 | |
| KR | 1997-0026136 A | 6/1997 | |
| KR | 2002-0049354 A | 6/2002 | |

* cited by examiner

*Primary Examiner* — William Miller
(74) *Attorney, Agent, or Firm* — Morgan, Lewis & Bockius LLP

(57) ABSTRACT

A hooking structure disposed on a door of a vehicle ensures safety of a passenger by preventing the door from being pushed inside in a side collision of the vehicle, by fastening a hooking structure integrally formed with the lower end of the door. The hooking structure may include: a welding flange that is fastened in parallel to an inner panel of a vehicle door; a hooking flange formed perpendicularly to an outer panel of the vehicle door; a connecting portion integrally connecting the welding flange with the hooking flange; a first closed-section flange disposed in an inverted wall shape between the welding flange and the connecting portion; and a second closed-section flange disposed in an inverted wall shape between the hooking flange and the connecting portion.

4 Claims, 5 Drawing Sheets

HOOKING STRUCTURE OF VEHICLE DOOR

CROSS-REFERENCE TO RELATED APPLICATION

The present application claims priority of Korean Patent Application Number 10-2012-0112773 filed Oct. 11, 2012, the entire contents of which application is incorporated herein for all purposes by this reference.

BACKGROUND OF INVENTION

1. Field of Invention

The present invention relates to a hooking structure disposed on a door of a vehicle, and more particularly, a hooking structure of a vehicle door which ensures safety of a passenger by preventing the door from intruding in a side collision of the vehicle, by fastening a hooking structure integrally formed with the lower end of the door.

2. Description of Related Art

The number of doors of vehicles can be adjusted, if necessary. Two to five doors are generally provided and four-door structure is the most popular, in which a two-door vehicle is called a coupe.

The coupe originally means a two-seat sedan and etymologically means a two-seat four-wheel box type wagon with a carter seat outside the wagon.

However, recently, slim vehicles with two doors, regardless of the available seats, and with a low roof are generally called coupes.

Although there is a problem that it is difficult to discriminate a coupe from a two-door sedan, a feature is that the vehicle body is designed low to reduce air resistance. Further, there are variations such as convertible coupes and hardtop coupes.

In the coupe type of vehicles, the lower end of a B pillar is rounded to implement the design. Therefore, the amount of overlapping between a side outer panel and a door beam is relatively small and shock load of a barrier locally concentrates on the side outer panel in a side collision, so that the door beam is unstably supported the B pillar is broken.

Further, the doors of the two-door or three-door vehicles are larger than those of the four-door or five-door vehicles, and accordingly, the doors intrudes relatively much inside at a relatively high speed at the side sill in a side collision.

The B pillar not only supports the roof of the vehicle, but improves rigidity and safety of the integral vehicle body and is one of the parts called an A pillar, a B pillar, and a C pillar from the front of the vehicle.

The A pillar, called a front pillar, is mounted on the windshield and the door windows, and the B pillar is called a center pillar or a side pillar, because it is mounted at the center of the front and rear doors. The C pillar is called a rear pillar, because it is mounted between the rear glass and the door window.

If necessary, the B pillar may be removed to ensure the design of the vehicle body and the visual field, but most vehicles are equipped with a B pillar because of the recent increasing concerns of customers on safety.

In the related art of the technical field, a hooking structure for preventing a door from intruding in a side collision is composed of an engaging part and an engaged part, at the lower end of a side sill, in which the engaged part is structured to suppress intrusion of the door by restricting a catcher pin in a collision and the engaging part is composed of a catcher pin preventing a collision, a reinforcing member, and a connection panel and a bolt that connect them.

However, the thin inner panel of a door of a vehicle seriously deforms in a side collision and the aspects of the deformation show large differences each time.

Therefore, there is a problem that the catcher pin of the engaging part is not correctly engaged with the engaged part due to rotation and separation of the catcher pin, when the catcher pin is simply connected only to the inner panel.

Therefore, in order to solve the problem, a technology of connecting the catcher pin to the connection panel and the reinforcing member, other than the inner panel of a door, with fasteners such as bolts, thereby making sure of transmission of load to the engaged part.

However, the technology has a problem in that the number of parts increases and the weight and manufacturing cost increase due to the use of the fasteners.

Further, as the number of parts increases, when the quality distribution of single parts is accumulated, the parts cannot keep the original positions and have instability that they cannot show their functions in a side collision.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a hooking structure that suppresses intrusion of a door and prevents rotation and separation of a door catching part in a side collision, by replacing several functional parts of the related art with one part.

Various aspects of the present invention provide for a hooking structure that efficiently reduces the time for stabilizing the quality in producing a vehicle and decreases positional quality distribution due to fastening of parts, by reducing the number of parts and simplifying the manufacturing method for implementing the technology.

According to various aspects of the present invention for solving the problems of the related art, a hooking structure of a vehicle door includes: a welding flange that is fastened in parallel to an inner panel of a vehicle door; a hooking flange formed perpendicularly to an outer panel of the vehicle door; a connecting portion integrally connecting the welding flange with the hooking flange; a first closed-section flange disposed in an inverted wall shape between the welding flange and the connecting portion; and a second closed-section flange disposed in an inverted wall shape between the hooking flange and the connecting portion.

The welding flange, the hooking flange, the connecting portion, the first closed-section flange, and the second closed-section flange may be integrally formed by pressing for a single product.

The second closed-section flange may be formed in two or more inverted wall shape.

The welding flange may be fastened to the lower end of the inner panel of the door by welding.

The present methods and apparatuses have other features and advantages apparent from the accompanying drawings, incorporated herein, and below Detailed Description, which together serve to explain certain principles of the present invention.

Figure 1:
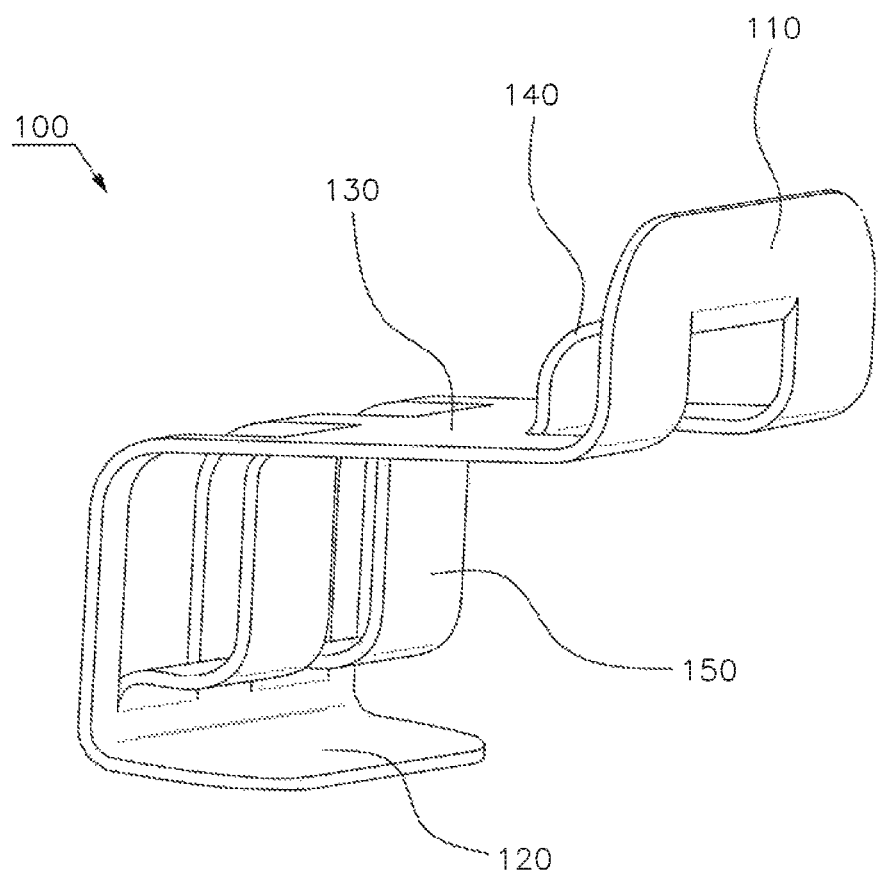
FIG. 1 is a perspective view of an exemplary hooking structure of a vehicle door according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Various aspects of the present invention ensure safety of a passenger by preventing a door from intruding inside a vehicle in a side collision of the vehicle.

In various embodiments, the present invention includes a welding flange 110 that is fastened in parallel to an inner panel of a vehicle door, a hooking flange 120 formed perpendicularly to an outer panel of the vehicle door, a connecting portion 130 integrally connecting the welding flange 110 with the hooking flange 120, a first closed-section flange 140 disposed in an inverted wall shape between the welding flange 110 and the connecting portion 130, and a second closed-section flange 150 disposed in an inverted wall shape between the hooking flange 120 and the connecting portion 130. One will appreciate that the welding flange, hooking flange, connecting portion, first closed-section flange and second closed-section flange may be monolithically formed.

FIG. 1 show a perspective view of a hooking structure 100 of a vehicle door according to various embodiments of the present invention.

The welding flange 110 may have a thin flat shape and be fastened to the inner panel of a vehicle door.

Welding, or bolts and nuts can be used for the fastening and the welding flange 100 may be fastened to a door panel assembly by welding to be applicable to a manufacturing line of vehicles without additional cost other than the existing assembly equipment.

The hooking flange 120, similar to the welding flange 110, has a thin flat shape and is mounted in a hole where a side outer panel of a door and a side member are mounted.

The mounting can be achieved by fitting, bolts and nuts, and welding.

The sizes and lengths of the welding flange 110 and the hooking flange 120 can be determined in various ways, depending on conditions such as the design of a vehicle and the size of a door, but they may have a thin and wide quadrangular shape to come in close contact with the inner panel and the outer panel of a door.

The first closed-section flange 140 and the second closed-section flange 150 allow the hooking structure to be firmly fastened to an engaged part of the side outer panel of a door by compensating for and supporting small rigidity of a thin inner panel of the door in a side collision of a door.

Further, it also can allow the hooking flange 120 to be firmly mounted on the inner panel of a door by connecting the welding flange 110 with the hooking flange 120.

The first closed-section flange 14 and the second closed-section flange 150 may have an inverted wall, which means a shape that is spaced so that of a portion of the surfaces has an intermediate space.

Although a rectangle-like shape is provided as the intermediate space as shown in the figures, it may be an ellipsis or a triangle.

The welding flange 110, the hooking flange 120, the connecting portion 130, the first closed-section flange 140, and the second closed-section flange 150 may be integrally formed by pressing for a single product.

This is because when the parts are separated manufactured and fastened, the positional quality distribution generated in fastening the parts increases, so that the engaging part and the engaged part are difficult to be corrected engaged in a collision.

Further, it is possible to reduce the manufacturing process and the manufacturing time of the parts and decrease the cost.

Figure 2:
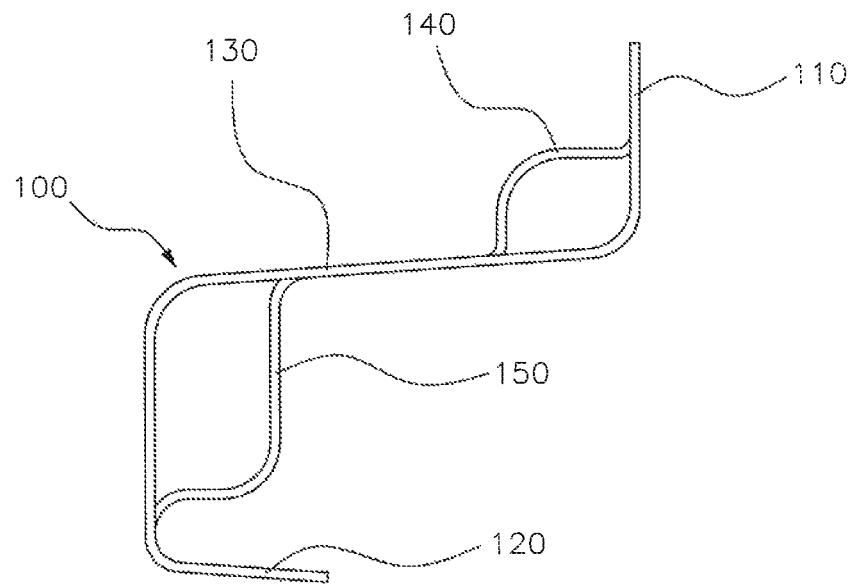
FIG. 2 is a side view of an exemplary hooking structure of a vehicle door according to the present invention.
Figure 3:
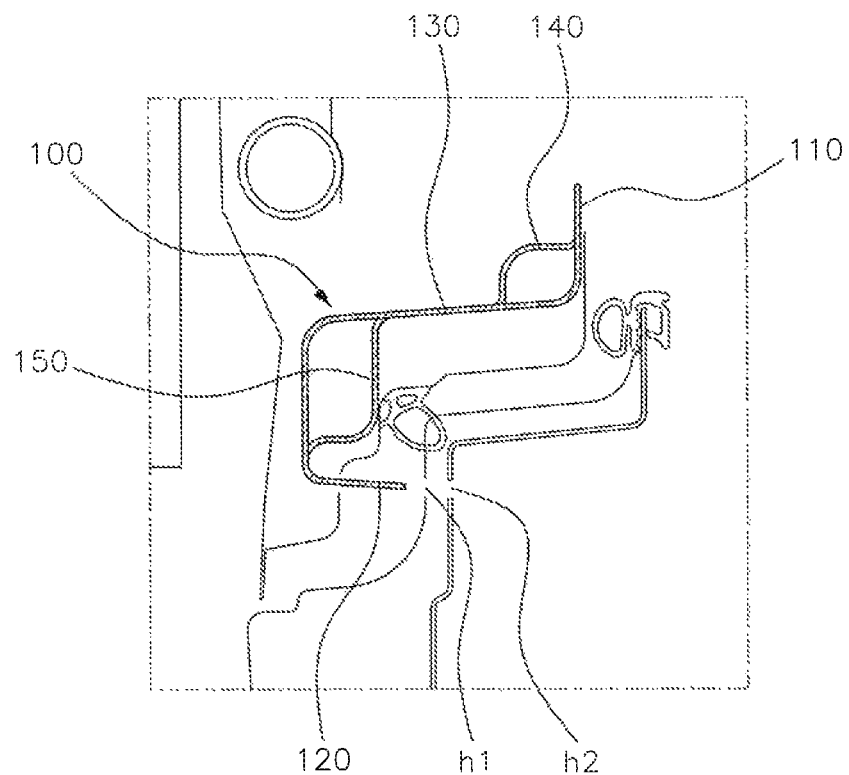
FIG. 3 is a side view showing when an exemplary hooking structure of a vehicle door according to the present invention is mounted on an inner panel of a door.

FIG. 2 is a side view of the hooking structure 100 of a vehicle door according to various embodiments of the present invention and FIG. 3 is a side view showing when the hooking structure 100 of a vehicle door is mounted on the inner panel of a door.

First, referring to the hooking structure 100 of a vehicle door shown in FIG. 2, as the first closed-section flange 140 and the second closed-section flange have inverted wall structures, they help the engaging part and the engaged part be engaged in a side collision.

Further, although the figures show the hooking structure 100 of a vehicle door which is a thin bending panel, the thickness can be adjusted, if necessary, and for the shape, the connecting portion 130, the hooking flange 120, and the connecting portion 130 may be formed at various angles, not the right angle.

Figure 4:
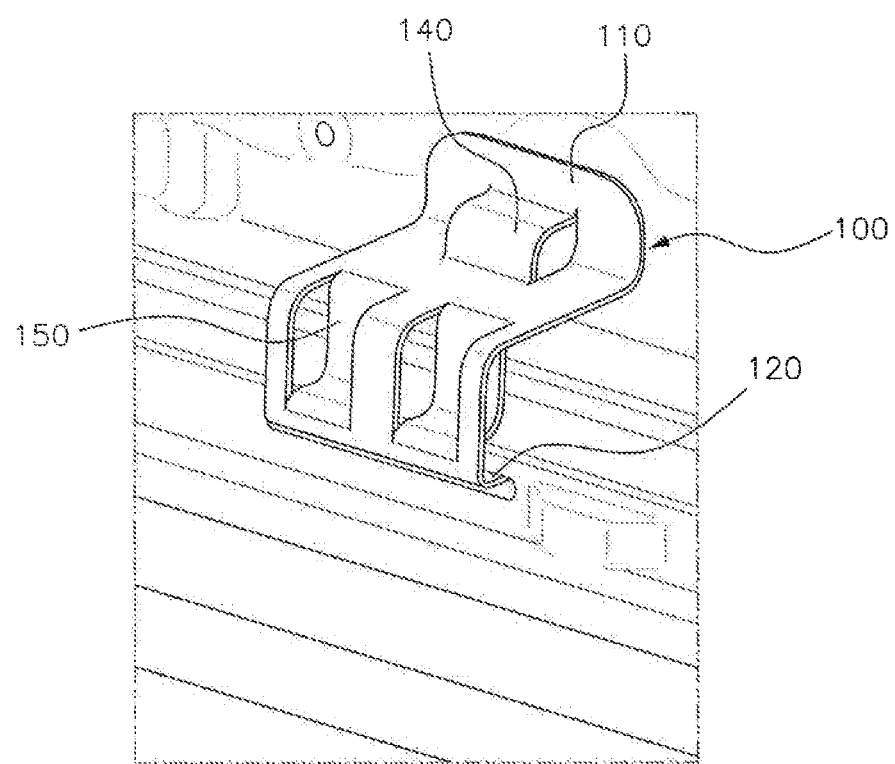
FIG. 4 is a perspective view showing when an exemplary hooking structure of a vehicle door according to the present invention is mounted on an inner panel of a door.

FIG. 4 is a perspective view showing when the hooking structure 100 of a vehicle door according to various embodiments of the present invention is mounted on an inner panel of a door.

Figure 5:
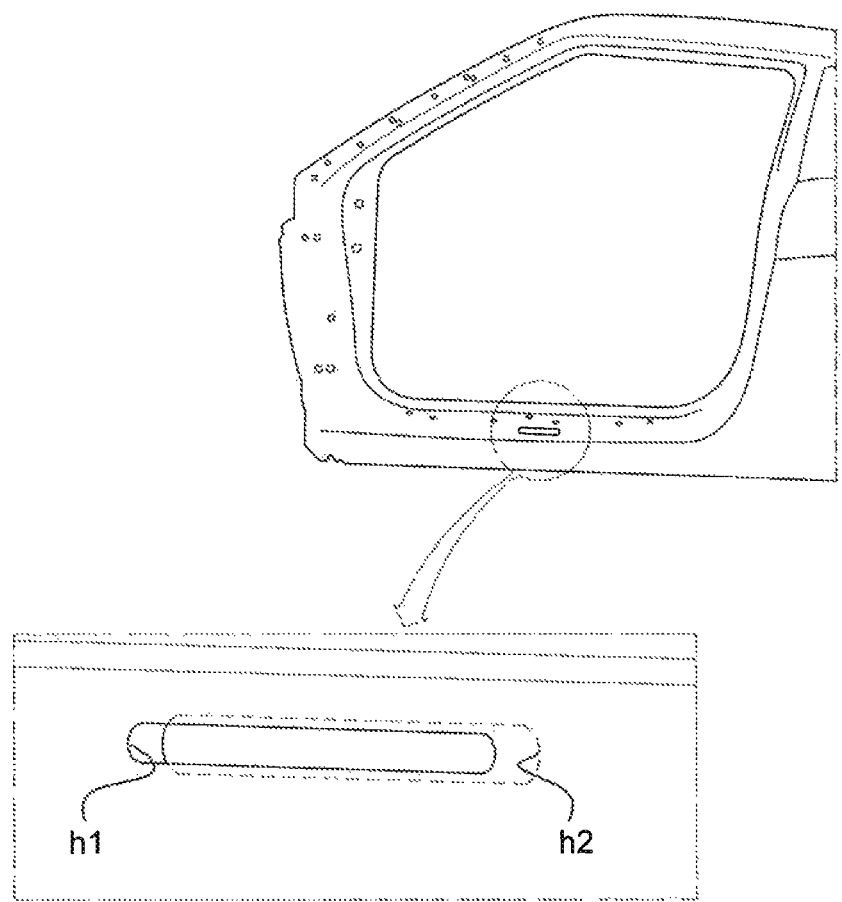
FIG. 5 is a plan view showing the position where an exemplary hooking structure of a vehicle door according to the present invention is mounted.

It can be seen that, as described above, the welding flange 100 is fastened to the inner panel of a door and the hooking flange 120 is aligned with holes h1 and h2 (see FIG. 3) where the side outer panel and the side member are formed in the door sill (see FIG. 5).

FIG. 5 is a perspective view showing the position where the hooking structure 100 of a vehicle door according to various embodiments of the present invention is mounted.

In the present invention, the engaging part may be formed by mounting the hooking structure at the lower end of a side sill of a door.

Further, the side outer panel and the side member may form an engaged part corresponding to the engaging part by constituting holes h1 and h2.

Figure 6:
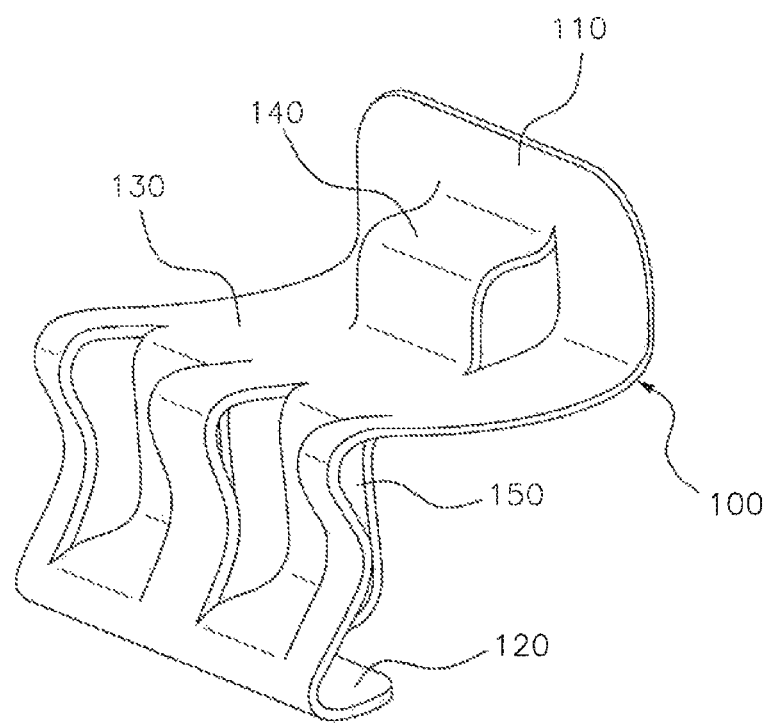
FIG. 6 is a perspective view showing deformation of an exemplary hooking structure of a vehicle door according to the present invention, after a side collision.

FIG. 6 is a perspective view showing deformation of the hooking structure 100 of a vehicle door according to various embodiments of the present invention, after a side collision.

In a side collision, a door impact barrier pushes the door pane inside and the hooking structure mounted inside the door panel helps the inner panel of the door maintain the shape and enter the engaged part of the side outer panel.

In this process, the hooking structure prevents the hooking flange 120 from rotating by means of the rigidity of the closed section and prevents the door from intruding by effectively carrying load to the side outer panel and the side member.

As various functional parts of the related art are integrally formed, it is possible to efficiently suppress the door from intruding inside in a side collision by firmly engaging the engaging part and the engaged part.

Further, it is possible to not only simplify the manufacturing process and reduce the cost, but be capable of adjusting the hooking performance by controlling the size of the closed-section flanges for optimizing the performances of each of vehicles.

According to the hooking structure of the present invention, which is formed by integrally forming several functions parts of the related art, it is possible to ensure safety of a passenger by effectively preventing intrusion of a door in a side collision.

Further, it is possible to efficiently reduce the quality stabilizing time, the manufacturing cost, and positional quality distribution between the parts, and to be applicable to a manufacturing line of vehicles, by simplifying the number of parts and the manufacturing process.

Further, it is possible to achieve measures for improvement for optimizing, by adjusting the size of the closed-section flanges and the strength/weakness of the hooking performance to optimize the performance of vehicles.

For convenience in explanation and accurate definition in the appended claims, the terms lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hooking structure of a vehicle door, comprising:
 a welding flange fastened to and in parallel with an inner panel of the vehicle door;
 a hooking flange formed perpendicularly to an outer panel of a vehicle door sill;
 a connecting portion integrally connecting the welding flange with the hooking flange;
 a first closed-section flange disposed in an inverted wall shape between the welding flange and the connecting portion; and
 a second closed-section flange disposed in an inverted wall shape between the hooking flange and the connecting portion;
 wherein the hooking flange is aligned with a hole in the vehicle door sill for penetration thereof during a side-impact collision.

2. The hooking structure of claim 1, wherein the welding flange, the hooking flange, the connecting portion, the first closed-section flange, and the second closed-section flange are monolithic.

3. The hooking structure of claim 1, wherein the welding flange is fastened to a lower end of the inner panel of the door by welding.

4. A hooking structure of a vehicle door, comprising:
 a welding flange fastened in parallel to an inner panel of the vehicle door;
 a hooking flange formed perpendicularly to an outer panel of the vehicle door;
 a connecting portion integrally connecting the welding flange with the hooking flange;
 a first closed-section flange disposed in an inverted wall shape between the welding flange and the connecting portion; and
 a plurality of spaced apart second closed-section flanges each disposed in an inverted wall shape between the hooking flange and the connecting portion.

* * * * *